United States Patent
Hawes

[11] Patent Number: 5,089,036
[45] Date of Patent: Feb. 18, 1992

[54] AIR SCRUBBER FOR ORGANIC SOLVENT REMOVAL

[75] Inventor: Philip B. Hawes, Oracle, Ariz.

[73] Assignee: Space Biospheres Venture, Oracle, Ariz.

[21] Appl. No.: 587,228

[22] Filed: Sep. 24, 1990

[51] Int. Cl.⁵ .................................................. B01D 47/14
[52] U.S. Cl. .......................................... 55/227; 55/234; 55/387
[58] Field of Search ............... 55/74, 234, 387, 227, 55/229, 259; 435/262, 264, 266

[56] References Cited

U.S. PATENT DOCUMENTS

| | | | |
|---|---|---|---|
| 2,793,096 | 5/1957 | Pomeroy | 55/387 X |
| 3,828,525 | 8/1974 | Copa et al. | 55/74 X |
| 4,161,426 | 7/1979 | Kneer | 55/74 X |
| 4,460,552 | 7/1984 | Zakrzewski | 55/387 X |
| 4,877,534 | 10/1989 | Nishida et al. | 55/74 X |
| 4,959,084 | 9/1990 | Wolverton et al. | 55/74 X |
| 4,961,763 | 10/1990 | Thompson et al. | 55/486 X |

FOREIGN PATENT DOCUMENTS

| | | | |
|---|---|---|---|
| 318897 | 2/1920 | Fed. Rep. of Germany | 55/387 |
| 2605606 | 8/1977 | Fed. Rep. of Germany | 55/74 |
| 51-075670 | 6/1976 | Japan | 55/74 |
| 52-000767 | 1/1977 | Japan | 55/74 |
| 52-058068 | 5/1977 | Japan | 55/74 |
| 52-065765 | 5/1977 | Japan | 55/74 |
| 52-071372 | 6/1977 | Japan | 55/74 |
| 53-039258 | 4/1978 | Japan | 55/387 |
| 54-026511 | 9/1979 | Japan | 55/387 |
| 55-157314 | 12/1980 | Japan | 55/74 |
| 56-053728 | 5/1981 | Japan | 55/74 |
| 58-011023 | 1/1983 | Japan | 55/387 |
| 60-125226 | 7/1985 | Japan | 55/387 |
| WO86/03689 | 7/1986 | PCT Int'l Appl. | 55/74 |
| 192523 | 11/1937 | Switzerland | 55/387 |

*Primary Examiner*—Robert Spitzer
*Attorney, Agent, or Firm*—Christie, Parker & Hale

[57] ABSTRACT

An air scrubber is described, comprising a closed cabinet; a layer of permeable growth medium for the growth of microorganisms near the bottom of the cabinet wherein a portion of the growth medium is submerged in water, and an air space above the growth medium for accommodating growing plants wherein air is passed upwardly through at least a portion of the submerged growth medium. In normal operation, the air scrubber operates in a closed loop with a glove box. Air is circulated between the air scrubber and the glove box.

16 Claims, 2 Drawing Sheets

AIR SCRUBBER FOR ORGANIC SOLVENT REMOVAL

FIELD OF THE INVENTION

This invention relates to a closed ecological system including humans, which is completely isolated from the earth's environment insofar as transfer of matter is concerned. The isolated, experimental environment requires constant monitoring. Therefore, experimentation that includes the use of toxic and volatile organic solvents is required. To maintain the purity of the air in the closed environment, it is important to remove these volatile organic pollutants from the air. An air scrubber for this purpose is described. The scrubber can also be utilized in non-closed systems to eliminate pollution by volatile organic chemicals.

BACKGROUND OF THE INVENTION

The earth comprises a biosphere in which microorganisms, plants, and animals, including humans, exist in a more-or-less steady state, wherein matter is a finite resource which is continually recycled. There is continual energy input in the form of solar radiation. The quantity of matter gained or lost to space outside the earth's atmosphere is minute.

It is desirable to provide a microcosm of the biosphere known as earth to study the interaction of components and for the development of techniques for influencing our environment. Such experiments are difficult at best in the open system provided on earth, since matter is exchanged between the earth's environment and the experiment. It is, therefore, desirable to provide a system that is completely enclosed so that no matter is exchanged with the earth's environment. It is desirable to have humans within this miniaturized biosphere to provide control and to conduct scientific research within a closed system, where conditions can be varied as desired.

Currently, a closed ecological system, referred to as Biosphere 2, is being established near Oracle, Ariz. The system completely encloses about one hectare of land and 175,000 cubic meters of space, isolated from the earth's environment by an impermeable skin so that no matter is transferred.

The closed environment requires constant monitoring to obtain data of scientific interest, such as the changes that occur with time in the isolated environment. Additionally, the monitoring is performed to provide data for determining what adjustments to the internal systems of the biosphere may be required to ensure its proper functioning.

Such monitoring involves experiments that use organic solvents. Many of these solvents are toxic and volatile and produce a form of pollution that can contaminate the isolated environment of the biosphere. If such pollution is not removed from the biosphere's environment it will accumulate, since there is no exchange of matter with the biosphere and the atmosphere outside the biosphere. Therefore, it is important to provide a system to not only contain fumes generated by the use of the organic solvents in the experiments or by accidental spills, but also to completely remove such fumes or accidental spills from the containment system, to prevent contamination of future experiments.

It is therefore desirable that the experiments using organic solvents are contained in a closed environment, such as a glove box. Additionally, it is desirable that the glove box is in a "closed loop" with an air-purification system or air scrubber. The air scrubber removes the volatile organic pollutants from the air and provides a means for decomposing the pollutants to non-toxic compounds which, preferably, can be recycled.

SUMMARY OF THE INVENTION

The present invention relates to an air scrubber for removal of volatile organic pollutants from air. The air scrubber comprises a closed cabinet, a layer of permeable growth medium for the growth of microorganisms near the bottom of the cabinet, means for maintaining a portion of the growth medium submerged in water, an air space above the growth medium for accommodating growing plants, and means for passing air upwardly through at least a portion of the submerged growth medium.

The plants and microorganisms exist in a symbiotic relationship in which the microorganisms convert the organic pollutants to carbon dioxide for use by the plants. The plants convert the carbon dioxide into complex organic material and provide aeration for the microorganisms.

In normal operation, the air scrubber operates in a closed air loop, comprising a glove box in which organic pollutants are produced, and an air scrubber, where the organic pollutants are removed from the air.

BRIEF DESCRIPTION OF THE DRAWINGS

The features and advantages of the present invention will be better understood when considered with reference to the following detailed description and the accompanying drawings, where.

DETAILED DESCRIPTION

The biosphere's closed environment requires constant monitoring to obtain experimental data of scientific interest relating to changes that occur, with time, in the isolated environment of Biosphere 2. Additionally, experimentation is required to provide information necessary to make adjustments to the internal systems of Biosphere 2, to ensure that they are functioning as required.

Such monitoring involves experiments and analyses that use toxic and volatile organic solvents. To prevent the environment of Biosphere 2 from becoming contaminated with the fumes generated by the use of the organic solvents and those generated by accidental spills, the organic pollutants must be removed from the atmosphere of the biosphere. Preferably, the material is not only removed from the biosphere's atmosphere, but is also disposed of in a non-toxic form. More preferably, the toxic material is recycled into non-toxic and usable products, since all waste products that cannot be recycled must be stored within the biosphere. Such storage takes up valuable space and limits the time the system can remain isolated or closed.

It is therefore desirable to recycle the fumes and waste material from the experiments using organic solvents. Experiments involving organic materials are contained within a glove box that is part of a closed loop with an air scrubber.

The air scrubber is designed to remove and decompose the pollutants, generating non-toxic end products, by using a symbiotic combination of microorganisms and plants. Air within the closed loop can be continually cycled from the glove box, where the pollutants are generated, to the air scrubber, where the pollutants are removed from the air. The purified air is then returned to the glove box.

Figure 1:
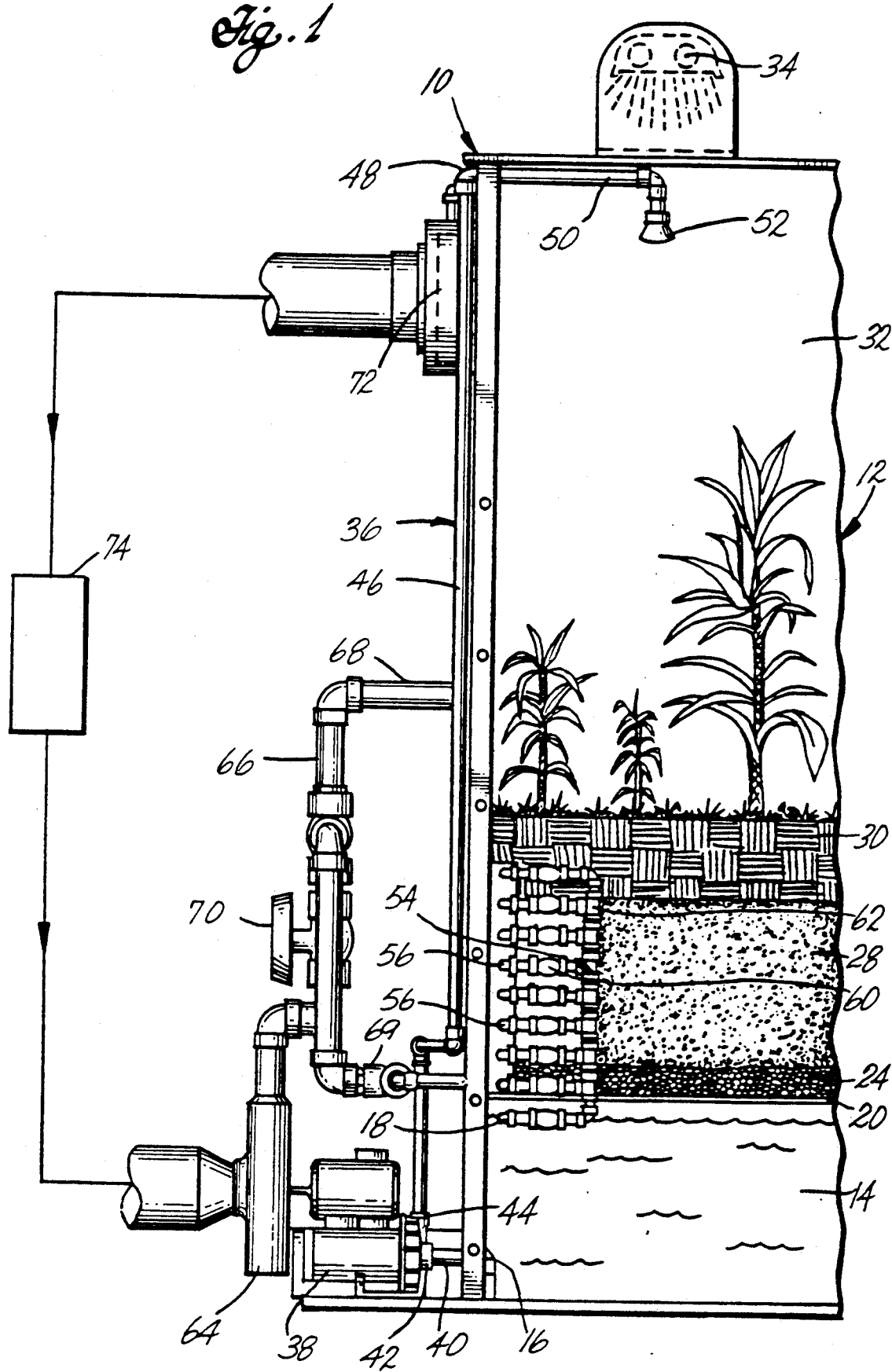
FIG. 1 shows a side elevation of an air scrubber for the removal of volatile organic pollutants from the air of a closed environment.

The air scrubber 10, shown in FIG. 1, comprises a cabinet 12 having a total volume of about 0.8 cubic meters. At the bottom of the cabinet is a sump 14, which acts as a water reservoir. Water, for use in the cabinet, is removed from the sump via an outlet port 16, located at the bottom of the sump. Excess water, from the cabinet, is returned to the sump via the manifold outlet 18 at the top of the sump. The sump is separated from the remainder of the cabinet by a water-tight partition 20. The cabinet and partition are conveniently made from transparent acrylic or other suitable material.

Figure 2:
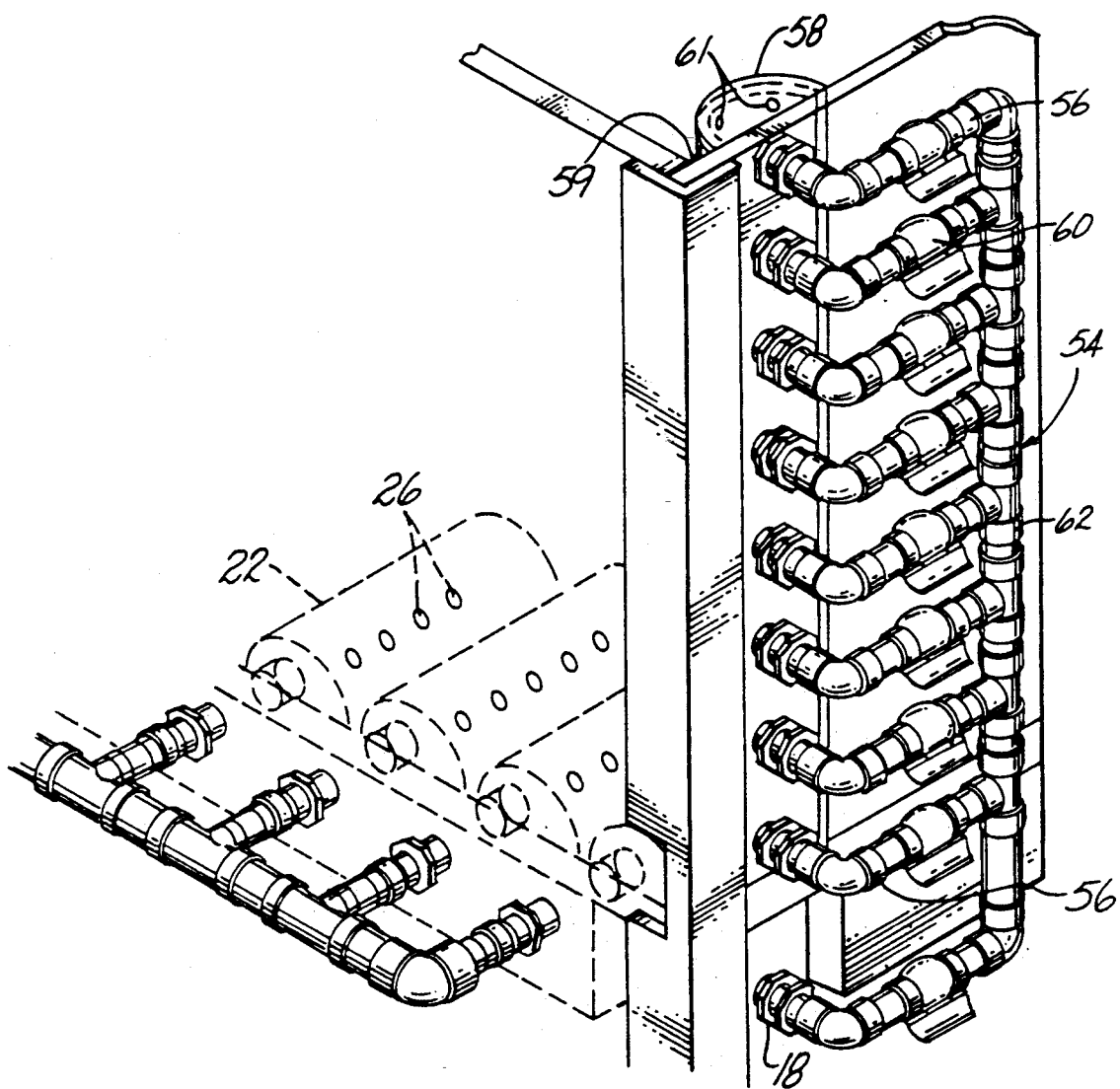
FIG. 2 shows a schematic view of a diffuser and drain manifold.

A plurality of diffuser pipes 22, located on the upper side of the partition, are embedded in a layer of pea gravel 24. The diffuser pipes, shown in FIG. 2, are semi-circular pipes of polyvinyl chloride (PVC), or other suitable material, fixed to the upper surface of the partition. Perforations 26 are included in the diffuser pipes so that air can escape into the layer of pea gravel. Percolating the air through the pea gravel aids in the diffusion of the air.

A carbon layer 28 is layered over the pea gravel. The carbon in the carbon layer is in the form of granules of 3-6 mm in size. The carbon layer functions to remove the organic pollutants from the diffused air. Carbon is preferred as a medium for removing the pollutants from the air, since it has a large surface area and a high affinity for organic pollutants. The carbon layer also provides an environment for the growth of microorganisms.

The microorganisms contained within the carbon layer are aerobic and are of a type that is capable of digesting organic pollutants, such as acetone, hexane, or the like, which become trapped in the carbon layer and of converting them to carbon dioxide. Microorganisms with the capacity to digest these organic compounds can be selected from nature, or they can be genetically engineered to have the desired properties required for the digestion of the organic solvents used within Biosphere 2. Preferably, when naturally-occurring microorganisms are used, the carbon layer is inoculated with a broad spectrum of microorganisms. The microorganisms that are best suited for survival under the prevailing conditions in the air scrubber will grow and flourish. Microorganisms that are poorly suited to the prevailing environment of the air scrubber will not survive, since they are unable to compete for nutrients and space. Therefore, the selection of the microorganisms used in the air scrubber is based on survival of the fittest.

It is desirable that the carbon layer is inoculated with a variety of microorganisms, since it is unlikely that the carbon layer naturally contains a significant population of microorganisms. Without inoculation, it can take some time to build up a sufficient population of microorganisms for thorough removal of pollutants from the air. Without inoculation, a substantial time may elapse before effective pollution removal is obtained.

The microorganisms that are preferred for inoculating the carbon layer of the air scrubber are the naturally-occurring aerobic symbionts found in conjunction with the plant species used in the system.

To further support the growth of the microorganisms, the carbon layer is partially submerged in water. The water provides a medium suitable for the establishment of cultures of some of the desired microorganisms and the dry area for others.

It is also desirable that the end product of the microorganisms' digestion of the organic compounds is complete oxidation to carbon dioxide. Since carbon dioxide is the desired end product, oxidative catabolic processes and, therefore, aerobic growth conditions for the microorganisms are preferred. To obtain the aerobic conditions, aeration of the carbon layer is helpful. Partial aeration of the carbon layer is provided by the diffused air, carrying the organic compounds, as it percolates through the carbon layer.

Primary aeration is provided by the root system of suitable plants. Preferably, the plants are marsh plants, such as *Typha latifolio, Phragmites communis*, and *Eicchornia crassioes*. Marsh plants are preferred for use in the air scrubber, since they translocate oxygen to their roots. The root system of these plants, therefore, provides a simple and efficient means of aerating the carbon layer. An additional reason for preferring marsh plants is that they are very tolerant of having their roots continually submerged in water, whereas other plants, under similar conditions, would rot. It is important that the plants are tolerant of continual exposure to water, since this type of environment is preferred as a growth medium for the microorganism cultures established within the carbon layer.

To support the growth of the plants, a layer of soil 30 is layered over the carbon layer. The soil layer provides mineral nutrients important for maintaining the plants' optimal growth rates and also provides a medium for anchoring the roots of the plants.

The plants and the microorganisms exist in a symbiotic relationship with each other inside the air scrubber. The plants, on the one hand, provide aeration of the microorganisms' medium, which promotes the aerobic growth of the microorganisms. The microorganisms, on the other hand, metabolize the organic pollutants to carbon dioxide, thus providing an essential carbon source for the plants.

The soil used in the air scrubber is a porous hydrophilic medium. The soil can comprise soil indigenous to the area and may be augmented with organic additive, compost, peat moss, sand and clay mixtures, small ceramic or plastic particles, or commercially-available potting soil or the like. Rich, aerated soil contains an ample variety of microorganisms for inoculating the carbon layer. Some soil may be mixed in for inoculation, or one may simply wait for natural spread of organisms from the soil layer and plant roots into the carbon layer.

So-called "potting soil" is preferred, since it is hydrophilic, rich in organic nutrients, stable, permeable, readily available, and inexpensive. Typical potting soils include sand, a small amount of clay, other mineral grains, and organic particles or fibers, and can include conventional chemical fertilizers and adjuvants.

A closed plant chamber 32 is located above the soil layer. The plant chamber provides a space for the growth of the plant foliage. The plant chamber also provides a space in which the carbon dioxide, produced by the action of the microorganisms, is collected and exposed to the leaves of the plants. The accumulated carbon dioxide is removed by the plants from the atmosphere of the plant chamber and is converted into complex organic material, in the form of plant matter, by the process of photosynthesis.

The plant matter is harvested periodically to prevent overgrowth of the plant chamber. The harvested plant matter, or similar plant matter, is made into compost and returned to the air scrubber. Returning the compost back to the air scrubber replenishes the valuable nutrients and minerals of the soil. Such replenishment promotes the continued growth of both microorganisms and plants within the air scrubber.

An additional requirement for the growth of the plants is light, since light is an essential requirement for photosynthesis. A lamp 34, which emits light of a wavelength suitable for promoting the photosynthetic reactions of the plants, such as a haline or other suitable lamp, is attached to the top of the cabinet.

A method for controlling the growth of the plants in the plant chamber is by regulating their light supply. When the air scrubber is not in use, the lights over the air scrubber can be turned off. In the absence of light, the plants' rate of growth is suppressed. Therefore, the need to harvest the plants in the plant chamber can be minimized or reduced by limiting the light available to the plants, if desired.

As discussed above, an additional requirement for the growth of the plants and microorganisms in the air scrubber, is water. A watering system 36 is provided for supplying water, as it is required, to the plants and microorganisms. The outlet port 16 of the sump is connected to the inlet 42 of a liquid-transfer pump 38 by a pipe 40. The outlet 44 of the liquid-transfer pump is connected to a vertical pipe 46. An L-shaped joint 48 is made with a second pipe 50. A shower nozzle 52 is at the open end of pipe 50. The shower nozzle is located at the top of the plant chamber.

The plants are watered by pumping water from the sump to the shower nozzle and spraying it from the shower nozzle onto the plants in the plant chamber. However, once the air scrubber is established and the plants and microorganisms in it are growing as desired, water is not routinely added to the air scrubber. Rather, water is added only periodically, to clean and refresh the foliage of the plants. Once the level of water in the air scrubber has been adjusted to the desired level, for optimum growth of the plants and microorganisms, additional water will not be needed, since the air scrubber is in a closed loop with a glove box 74, and there is little or no water loss from the system, except in harvested biomass.

The water level in the air scrubber is an important factor in the determination of the satisfactory growth of the microorganisms and plants. An inadequate level of water results in a limited population of microorganisms, since the volume in which they can grow is smaller than desired. Alternately, a level of water that is too high will result in rotting of the plants and an inability on the part of the plants to anchor themselves into the soil, due to a lack of a solid support medium. Therefore, it is desirable to provide a means of adjusting the level of the water in the pea gravel, carbon, and soil layers, so that the growth of the microorganisms and plants can be optimized and to simulate naturally-occurring, seasonal, periodic "drawdowns."

A drain manifold 54 is provided to adjust the level of water in the growth mechanism, so that growth of plants and microorganisms can be optimized. The drain manifold comprises a series of pipes 56 connected at one end to the cabinet. Each pipe is connected to the cabinet at a different depth within the cabinet. Some pipes are connected at the level of the soil layer, some are connected at different levels in the carbon layer, and some are connected in the pea gravel layer.

On the inside of the cabinet, and located to cover the inlets of the pipes, is a PVC pipe, cut in half to form a semi-circular shell 58. The semi-circular shell is affixed to the inside of the cabinet wall 59. Perforations 61 are included in the shell to allow water to pass through the shell to the pipes of the manifold. Preferably, the perforations are small enough to inhibit the soil, carbon granules, and pea gravel from entering and clogging the manifold pipes. Also, the perforations retain the soil, carbon granules, and pea gravel in the air scrubber.

Each of the manifold pipes has a ball valve 60 to control the water level. When a ball valveiis in the off position, water is unable to flow out of that particular manifold pipe so that the water level in the cabinet is maintained at a height greater than that of the "closed" pipe. When a ball valve is in the open position, water is able to flow out of that particular manifold pipe so that the water level in the cabinet is maintained at a height equal to that of the "open" pipe.

The other end of each of the manifold pipes is connected to a collector pipe 62. The collector pipe is connected to the manifold outlet 18 in the sump. The drain manifold 54 provides a means of returning any excess water to the sump. The air scrubber, therefore, is a "closed loop" with respect to water. As a result of the closed nature of the air scrubber, little or no water needs to be added to the plant chamber once the desired water level has been established.

The air scrubber is designed to remove pollutants from air. Therefore, it is important to provide an aircirculation system to bring polluted air from the experiment work area, where organic solvents are used in various experimental procedures, to the air scrubber, where the pollutants are removed, and then return the purified air to the experiment work area. The air-circulation system also provides a "closed loop" with respect to air.

The air-circulation system is driven by a direct-drive blower 64. The outlet of the blower is connected to a T-conduit 66. One end 68 of the T-conduit is connected to the plant chamber 32, and the other end 69 is connected to the diffuser pipes 22. The flow of air to the diffuser pipes, or to the plant chamber, can be regulated by means of a valve 70. The valve directs air flow to either the diffuser pipes or directly to the plant chamber. Air that is introduced into the air scrubber via the diffuser pipes is diffused into small bubbles as the air is released from the perforations in the diffuser pipes. Further diffusion of the air is achieved by bubbling the air through the granules of the pea gravel. A small bubble size is preferred, since small bubbles present a large surface-area-to-volume ratio to the carbon granules, and the organic pollutants that they are carrying are more readily adsorbed. As the air bubbles rise through the carbon layers, the organic pollutants are adsorbed onto the carbon and soil particles. Once the pollutants have been adsorbed, they are then available to the microorganisms as a carbon source for metabolism. The small air bubbles also help to oxygenate the carbon layer and, therefore, promote oxidative catabolism of the organic pollutants by the microorganisms.

As the microorganisms digest the pollutants, they generate carbon dioxide. The carbon dioxide and the air bubbles, which have had the pollutants removed, then percolate through the soil layer and out into the plant chamber. The carbon dioxide is then available to the plants in the plant chamber as a carbon source which they can metabolize into complex organic material, i.e., starches, etc.

The air bubbles not only percolate through the solid layers of pea gravel, carbon, and soil, but also through water. As a result, the air becomes very humid.

The humidity of the air is also increased by the warmth of the air scrubber, generated by the heat of the lamps, as well as the ambient external temperature. The temperature of the air scrubber is preferably at 25° to 38° C. This temperature range is preferred, since it promotes the rapid growth of the microbial cultures in the carbon layer. Additionally, the plants selected for use in the air scrubber are naturally found in temperate and tropical climates and are best adapted to growth at these temperatures, although, at lower temperatures, microbial action continues even though the plant growth is inhibited.

It is desirable to prevent condensation of the water from the moist, warm air from the air scrubber as it cools down when it is returned to the glove box. If the water is not cooled prior to its return to the glove box, water may condense and accumulate in the glove box and the air lines leading to it. The presence of water in the glove box and the air line would likely interfere with the experiments that are being conducted in the glove box. Any water that reached the glove box would have to be continually removed. As a result, water would be continually removed from the air scrubber system. Since it is preferred that the air scrubber is a closed system with respect to air and water, it is preferable to remove the moisture from the air before it is returned to the glove box.

An air cooler 72, located at the top of the plant chamber, is provided to cool the air and reduce its moisture content before the air is returned to the glove box 74. The air cooler also forms the air outlet of the plant chamber. In addition to preventing condensation of water in the glove box, the air cooler also ensures that water is not removed from the plant chamber. If water were continually being removed from the plant chamber in the form of humidity, the water would have to be replenished. The air cooler provides a means of cooling the air and returning the excess moisture to the plant chamber.

Experiments in the glove box will not always be in progress, but rather will be conducted on an intermittent basis. Therefore, when the glove box is not in use, there will be no organic pollutants being generated, or, at most, there will only be residual amounts of pollutants within the system. At times when the level of pollutants is very low, the air scrubber need only be run at a slow or idling rate. The flow rate of the air through the air scrubber is about 7.1 liters/second when it is idling and removing low levels of pollution.

At other times, when experiments are in progress, the level of pollutants in the air from the glove box will be at an intermediate level. The flow rate of the air through the air scrubber is about 14.2 liters/second when the air scrubber is being operated at an intermediate level and removing normal levels of organic material that is generated in the normal course of an experiment.

At still other times, accidental spills are expected to occur within the glove box and, as a result, will generate high levels of pollution. At such time, the air scrubber is required to operate at its maximum capacity, to remove all of the organic pollutants from the air. The flow rate of the air through the scrubber is at a rate of up to 14.2 liters/second when the air scrubber is removing high levels of pollution resulting from spills of organic solvents.

When the air scrubber is removing low levels of pollution, a single passage of the air through the scrubber may be sufficient to purify the air. However, when there is a high level of pollution, such as that resulting from accidental spills, the polluted air may have to be passed through the air scrubber several times before all the organic pollutants are removed and the air is purified.

Low levels of pollution are about 125 milliliters (ml) of solvent per week. High levels of pollution, such as levels that might result from spills, are up to about 300 ml per incident.

The present invention is described in relation to only one working embodiment and is for illustration purposes. Variations will be apparent to those skilled in the art. For example, the air scrubber described is for small-scale, experimental procedures that can be conducted in a glove box. However, it would be possible to "scale up" the air scrubber so that it could be used to purify the air from a whole room, or even from an industrial-sized installation. Additionally, other types of plants, and the growth conditions of plants and microorganisms, may be used to obtain digestion of organic pollutants. Therefore, the present invention is not intended to be limited to the working embodiment described above. The scope of the invention is defined in the following claims.

What is claimed is:

1. An air scrubber comprising:
    a closed air loop;
    a cabinet within the air loop;
    a layer of permeable growth medium near the bottom of the cabinet containing aerobic microorganisms and plants;
    means for maintaining a portion of the growth medium submerged in water;
    an air space above the growth medium to accommodate the plants; and
    means for passing air upwardly through at least a portion of the submerged growth medium.

2. An air scrubber as recited in claim 1 comprising marsh plants growing in the growth medium.

3. An air scrubber as recited in claim 1 comprising an overflow manifold for adjusting the level of growth medium submerged in water.

4. An air scrubber as recited in claim 1 wherein the growth medium comprises a layer of carbon granules and a layer of soil.

5. An air scrubber as recited in claim 1 comprising a plurality of water outlets at differing elevations for adjusting the depth of water in the cabinet.

6. An air scrubber as recited in claim 1 comprising means in the air space for applying overhead watering to plants growing in the growth medium.

7. An air scrubber as recited in claim 6 comprising a sump, means for recirculating water from the sump to the overhead watering means, and overflow means for returning water from the growth medium to the sump.

8. A closed loop air scrubber comprising:
    a glove box;
    an air scrubber comprising:
        a closed cabinet;

a lower inlet to the cabinet connected to the glove box;
a permeable growth medium in a lower portion of the cabinet;
a closed air space above the growth medium to accommodate plants growing in the qrowth medium:
an upper outlet from the closed air space and connected to the glove box;
a sump in the bottom of the cabinet below the growth medium;
means for circulating water from the sump back to the growth medium; and
means for circulating air between the air scrubber and the glove box.

9. An air scrubber as recited in claim 8 comprising means for maintaining at least a lower portion of the growth medium submerged in water.

10. An air scrubber as recited in claim 8 comprising means near the top of the air space for overhead watering of plants growing in the air space and means for circulating water from the sump to the overhead watering means.

11. An air scrubber as recited in claim 8 comprising means for adjusting the level of water submerging a portion of the growth medium.

12. A closed loop air scrubber comprising:
a closed source of organic vapors;
a closed cabinet connected to the source of organic vapors;
a permeable growth medium in the cabinet capable of sustaining growth of microorganisms;
means for circulating air from the source of organic vapors through the growth medium in the cabinet and back to the source;
marsh plants growing in the growth medium; and
sufficient water in the bottom of the cabinet for submerging at least a portion of the roots of the plants.

13. An air scrubber as recited in claim 12 further comprising a growth lamp in the cabinet for illuminating the plants with sufficient light to sustain growth of the plants.

14. An air scrubber as recited in claim 12 further comprising means for adjusting the depth of water in the bottom of the cabinet.

15. An air scrubber as recited in claim 14, wherein the means for adjusting depth comprises a plurality of water outlets from the cabinet and means for selectively opening or closing each of the outlets.

16. An air scrubber as recited in claim 12, wherein the growth medium comprises at least a layer of soil and a layer of carbon particles.

* * * * *

UNITED STATES PATENT AND TRADEMARK OFFICE
CERTIFICATE OF CORRECTION

PATENT NO. : 5,089,036

DATED : February 18, 1992

INVENTOR(S) : Philip B. Hawes

It is certified that error appears in the above-identified patent and that said Letters Patent is hereby corrected as shown below:

Column 4, line 21, change "*crassioes*" to -- *crassipes* --.

Column 6, line 17, change "valveiis" to -- valve is --.

Column 6, line 35, change "aircirculation" to
    -- air-circulation --.

Signed and Sealed this

Twenty-ninth Day of June, 1993

Attest:

MICHAEL K. KIRK

*Attesting Officer*   *Acting Commissioner of Patents and Trademarks*